US012712737B2

(12) United States Patent
Norem

(10) Patent No.: US 12,712,737 B2
(45) Date of Patent: Aug. 18, 2026

(54) PER UNIT TIME MESSAGE AUTHENTICATION CODE

(71) Applicant: Silicon Laboratories Inc., Austin, TX (US)

(72) Inventor: Joshua J. Norem, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 575 days.

(21) Appl. No.: 17/694,005

(22) Filed: Mar. 14, 2022

(65) Prior Publication Data

US 2023/0291568 A1 Sep. 14, 2023

(51) Int. Cl.
*H04L 9/32* (2006.01)
*H04L 9/40* (2022.01)

(52) U.S. Cl.
CPC ........ *H04L 9/3242* (2013.01); *H04L 63/0428* (2013.01)

(58) Field of Classification Search
None
See application file for complete search history.

(56) References Cited

U.S. PATENT DOCUMENTS 8,009,985 B1 * 8/2011 Roberts ................. H04L 1/0017 398/47
9,436,595 B1 * 9/2016 Benitez ............... G06F 12/0246
9,438,537 B2 * 9/2016 Edmiston ............ H04L 49/9063
11,201,956 B2 * 12/2021 Zhang ................... H04L 9/3213
2003/0074567 A1 * 4/2003 Charbonneau ........ G06F 21/565 713/176
2005/0033960 A1 * 2/2005 Vialen .................. H04L 63/123 713/170
2005/0210260 A1 * 9/2005 Venkatesan ........... H04L 9/0643 713/180
2007/0113083 A1 * 5/2007 Volkovs ................ H04L 9/3242 713/168
2008/0104397 A1 5/2008 Paddon et al.
2008/0112561 A1 * 5/2008 Kim ...................... H04L 9/3242 380/42

(Continued)

FOREIGN PATENT DOCUMENTS

CN 101202623 A 6/2008
CN 101529937 A 9/2009

(Continued)

*Primary Examiner* — John B King
*Assistant Examiner* — Alex D Carrasquillo
(74) *Attorney, Agent, or Firm* — Nields, Lemack & Frame, LLC

(57) ABSTRACT

A system for securely transmitting data between two devices is disclosed. Each device comprises an interface, an encryption module, a decryption module and a message authentication code (MAC) generator. The encryption and decryption modules may utilize a stream cipher, while the MAC generator utilizes a hashing algorithm. A MAC is transmitted after a predetermined amount of time, regardless of the amount of activity on the interface. The device receiving the MAC compares it to the MAC that it generated to ensure that they match. This guarantees that a breach of integrity can be detected in a reasonable amount of time and addressed accordingly. This system may utilize an interface having bidirectional data signals or unidirectional data signals.

17 Claims, 4 Drawing Sheets

(56) References Cited

U.S. PATENT DOCUMENTS

| | | | | |
|---|---|---|---|---|
| 2009/0210707 | A1* | 8/2009 | De Lutiis | H04L 63/123 713/170 |
| 2010/0027783 | A1* | 2/2010 | Yup | H04L 9/0643 380/44 |
| 2011/0296193 | A1* | 12/2011 | Alghathbar | H04L 9/0643 713/181 |
| 2013/0136145 | A1* | 5/2013 | Bi | H04L 69/22 370/475 |
| 2014/0078926 | A1* | 3/2014 | Nishioka | H04L 43/067 370/252 |
| 2015/0220755 | A1* | 8/2015 | Mayer | G06F 21/606 726/30 |
| 2016/0062921 | A1* | 3/2016 | Kim | H04L 9/3242 713/193 |
| 2016/0297401 | A1* | 10/2016 | Haga | H04L 9/0891 |
| 2016/0315949 | A1* | 10/2016 | Falk | H04L 67/568 |
| 2017/0048241 | A1* | 2/2017 | Tanabe | H04L 63/123 |
| 2017/0093567 | A1* | 3/2017 | Gopal | G06F 21/602 |
| 2018/0176230 | A1 | 6/2018 | Wei et al. | |
| 2018/0219782 | A1* | 8/2018 | Mehta | H04L 47/125 |
| 2020/0351731 | A1* | 11/2020 | Kim | H04W 36/0094 |
| 2022/0376922 | A1* | 11/2022 | Kalach | H04L 9/0643 |

FOREIGN PATENT DOCUMENTS

| | | | |
|---|---|---|---|
| CN | 107431691 | A | 12/2017 |
| WO | 2021/116975 | A1 | 6/2021 |

* cited by examiner

PER UNIT TIME MESSAGE AUTHENTICATION CODE

FIELD

This disclosure describes systems for detecting security breaches on an interface between two devices.

BACKGROUND

System on Chip (SoC) and other similar devices are created by disposing a processing unit, its instructions and other functions within a single die. In some cases, the processing unit may be an ARM-based processor, although other processors may be used. Further, in some embodiments, the instructions are disposed within a rewritable nonvolatile memory (NVM), such as a FLASH memory.

In certain embodiments, it may be beneficial to have the nonvolatile memory disposed in a separate die from the processing unit. This may be due to differences in fabrication technologies or other factors. In these embodiments, the processing unit must access the external nonvolatile memory to obtain the instructions to be executed.

When attempting true execution in place from external memories the system needs to be efficient when fetching cache lines (typically 128 bit) from FLASH memory in an essentially random access regime. The system has no knowledge of the future, for example when fetching line N, it is unknown when line N+1 will be fetched or what address will be required.

However, in this configuration, the instructions to be executed by the processing unit may be observed or altered by a hacker or bad actor as it is transmitted from the FLASH memory to the SoC. Many systems using external nonvolatile memory provide no protection at all relying on the difficulty of accessing the interconnect to prevent attacks on the bus. Some systems may encrypt the flash data using Advanced Encryption Standard: Counter Mode (AES-CTR). While this does prevent reading of the data and is efficient, it does very little to protect against an attacker modifying the data. A property of CTR is that when a bit is flipped in the cipher text, it is flipped in the plain text allowing attackers to arbitrarily flip bits in the data stream. Some more recent devices support the use of Advanced Encryption Standard: Efficient and Compact Subgroup Trace Representation (AES-XTS). This scheme is MUCH less efficient in this particular use case than CTR and while it does provide more protection against data manipulation, it provides little to no protection against fault injection attacks.

Ultimately the only way to cryptographically protect an interconnect from fault injection may be to include a message authorization code (MAC) of sufficient strength to identify any changes to the transmitted cipher text. Returning to the initial use case, it is noted that providing a 16-bit MAC, which is of dubious strength, on a 128-bit read would incur a 12.5% overhead in data transmitted which directly equates to latency and power consumption. Further, the traditional method of diluting that overhead by reading larger chunks is not an applicable solution. For example, if the system were to fetch 256-bits from nonvolatile memory with a 16-bit mac then the MAC overhead would be reduced to 6.25%. However, in this case, the probability that the first line contains a branch and that the second line is not needed is high. If it is assumed that there is a 20% chance that the second 128-bits is not needed, then 20% of the time, 50% of the transmitted data is overhead, implying that the true overhead is 10% for the data read that was not required and 6.25% for the MAC for a total of 16.25%.

Therefore, it would be beneficial if there were a system that could offer data protection while not significantly affecting performance and latency.

SUMMARY

A system for securely transmitting data between two devices is disclosed. Each device comprises an interface, an encryption module, a decryption module and a message authentication code (MAC) generator. The encryption and decryption modules may utilize a stream cipher, while the MAC generator utilizes any cryptographic MAC algorithm. A MAC is transmitted after a predetermined amount of time, regardless of the amount of activity on the interface. The device receiving the MAC compares it to the MAC that it generated to ensure that they match. This guarantees that a breach of integrity can be detected in a reasonable amount of time and addressed accordingly. This system may utilize an interface having bidirectional data signals or unidirectional data signals.

According to one embodiment, a system for securely transmitting data between a first device and a second device is disclosed. The system comprises a first device, comprising an interface to transmit and receive data from the second device; a first encryption module to encrypt outgoing data before it is transmitted over the interface; a first decryption module to decrypt data received from the second device and create incoming data; and a first message authentication code (MAC) generator, wherein the first MAC generator comprises a hashing algorithm that utilizes the outgoing data and the incoming data; wherein the first device transmits the MAC to the second device based on expiration of a timer; and a second device, comprising the interface to transmit and receive data from the first device; a second encryption module to encrypt transmit data before it is transmitted over the interface; a second decryption module to decrypt data received from the second device and create received data; a second message authentication code (MAC) generator, wherein the second MAC generator comprises the hashing algorithm that utilizes the outgoing data and the incoming data; and a verifier to compare the MAC received from the first device to the MAC generated by the second MAC generator. In some embodiments, the first encryption module, the second encryption module, the first decryption module and the second decryption module implement a stream cipher. In certain embodiments, the stream cipher is AES-CTR. In some embodiments, the first MAC generator and the second MAC generator implement a hashing algorithm. In some embodiments, the hashing algorithm is GHASH. In some embodiments, the outgoing data and the incoming data are arranged sequentially in a data buffer, and when the data buffer reaches a predetermined length, the first MAC generator computes a hash. In certain embodiments, gaps between transmissions on the interface are filled in the data buffer. In some embodiments, static data are used to fill the data buffer during the gaps. In some embodiments, the first device comprises a first pseudorandom number generator, and wherein pseudorandom numbers are used to fill the data buffer during the gaps. In some embodiments, upon expiration of the timer, if the data buffer has less than the predetermined length, a remainder of the data buffer is filled with static data. In some embodiments, the first device comprises a first pseudorandom number generator, and wherein upon expiration of the timer, if the data buffer has less than the predetermined length, a remainder of the data buffer is filled with pseudorandom numbers.

According to another embodiment, a method of securely transmitting and receiving data on an interface is disclosed. The method comprises arranging data to be transmitted on the interface and data received from the interface sequentially in a data buffer; computing a hash when the data buffer reaches a predetermined length; repeating the arranging and computing until a timer expires; and transmitting a MAC when the timer expires. In some embodiments, static data is inserted in the data buffer when the interface is idle. In some embodiments, pseudorandom numbers are inserted in the data buffer when the interface is idle. In certain embodiments, the data transmitted and received on the interface is encrypted using a stream cipher. In some embodiments, the method also includes utilizing the stream cipher to encrypt the hash prior to transmitting. In some embodiments, the data received on the interface is decrypted before being arranged in the data buffer. In some embodiments, data to be transmitted is arranged in the data buffer prior to being encrypted. In some embodiments, the timer is started when data is detected on the interface.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
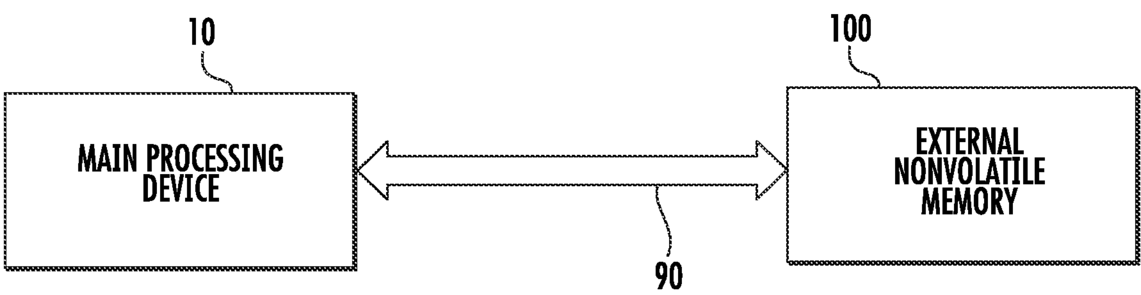
FIG. 1 shows a main processing device and an associated external nonvolatile memory.

FIG. 1 shows a block diagram with a main processing device 10 and an associated external nonvolatile memory device 100. The main processing device 10 may include an embedded processing unit and a cache memory. In certain embodiments, the main processing device may be fabricated using 22 nm technology. In some embodiments, a smaller geometry may be used. This choice allows a maximum number of transistors, while minimizing power consumption.

The external nonvolatile memory device 100 may be fabricated using an older technology, such as 40 nm or 90 nm. These technologies are better adapted to nonvolatile memories, such as FLASH memories.

Additionally, an interface 90 may be used to communicate between the two devices. The interface 90 may include one or more data signals. In some embodiments, the data signals are bidirectional. In other embodiments, the data signals may be unidirectional.

As described above, it is beneficial to include a MAC with packets of information. However, the use of MACs may present a compromise between latency and overhead. In other words, the devices cannot detect whether a breach in security has occurred until the MAC has been transmitted. Thus, to minimize latency, MACs should be sent often. However, the frequent transmission of MACs incurs a lot of overhead. Conversely, if overhead is minimized by adding MACs to larger amounts of data, then it takes much longer to determine that there is a breach.

The present disclosure describes a novel approach to this problem. Rather than inserting a MAC after each packet, the present system inserts a MAC that is computed over a predetermined period of time, regardless of the amount of data that is being transmitted during that predetermined period of time. This approach limits the MAC overhead while guaranteeing a maximum latency in detecting breaches in security.

In certain embodiments, the MAC may be 128 bits. In other embodiments, the MAC may be computed based on chunks of data that are each 128 bits, but the MAC that is transmitted is then reduced to a smaller number of bits, such as 48 bits.

In one embodiment, the predetermined period of time may be roughly 1 microsecond or less. At data rates of 2.5 Gb/s, this is equal to about 2560 bits.

For applications like code execution, where there is a significant delay between the introduction of a modification and that modification having an intended effect, this approach may ensure that the modification is detected before the intended effect can occur. Upon detection, the device may be reset to ensure that it returns to a known good state.

Figure 2:
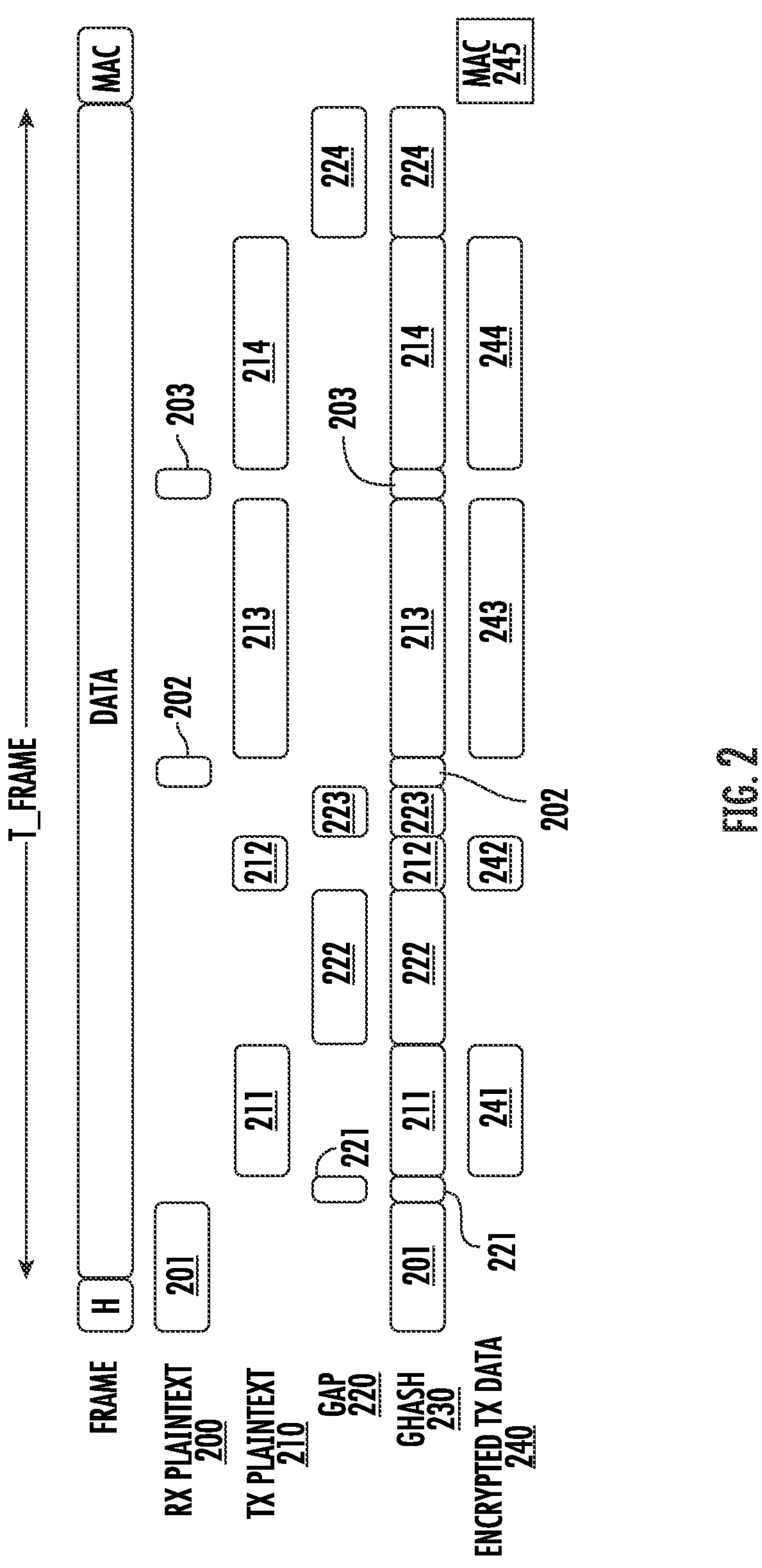
FIG. 2 shows a timing diagram showing the operation of the interface.

FIG. 2 shows a timing diagram that implements this concept according to one embodiment. This figure shows the data being transmitted in each direction, the gaps in transmission, the data used to generate the MAC, and the data that is encrypted prior to transmission. In this system, there are two devices, which may be the main processing device 10 and the external nonvolatile memory device 100 shown in FIG. 1. Each device calculates the MAC using the same data. Further, one of the devices transmits its calculated MAC to the second device. The second device then compares the transmitted MAC to its own calculated MAC to determine if there has been a breach. In certain embodiments, the device that transmits the MAC may be the external nonvolatile memory device 100 and the device that performs the comparison may be the main processing device 10. In the following description, it is assumed that the external memory device transmits the MAC to the main processing device 10. Note that this is not a requirement; the main processing device 10 may transmit the MAC to the external nonvolatile memory device 100, which performs the comparison.

In this diagram, all data received by the external nonvolatile memory device 100 is decrypted to generate the RX plaintext 200. All data to be transmitted by the external nonvolatile memory device 100 is referred to as TX plaintext 210. The TX plaintext 210 is then encrypted and transmitted as encrypted data 240. In certain embodiments, the plaintext is encrypted using AES-CTR, although other stream ciphers may be used.

The periods of time when there is no data being transmitted or received is referred to as GAP 220. Finally, GHASH 230 represents the data block that is used to compute the MAC. GHASH is a specific algorithm that may be used to compute the MAC. Other methods of MAC generation are also possible. For example, in certain embodiments, a different hashing algorithm may be used.

The most common embodiment, which is used in GCM, is that a hash is computed and then encrypted. In the embodiment shown in the figures, GHASH is the hashing algorithm used for MAC generation. As noted above, there are other methods of generating a MAC. CMAC, for example, uses the AES block cipher to hash the message. Thus, the hashing algorithm used to generate the hash is not limited by this disclosure.

That MAC 245 is then encrypted using AES-CTR, or another stream cipher, and transmitted to the main processing device 10.

The main processing device 10 may initiate activity by transmitting a first encrypted command and optional data to the external nonvolatile memory device 100. In some embodiments, all commands and responses may be encrypted using the AES-CTR algorithm. As noted above, in other embodiments, a different stream cipher may be utilized.

The external nonvolatile memory device 100 then decrypts the first encrypted command to create a first plaintext command 201. The external nonvolatile memory device 100 may require some time to process the first plaintext command 201 and generate the appropriate response. At a later time, the external nonvolatile memory device 100 generates a first plaintext response 211. That first plaintext response 211 is then encrypted and transmitted to the main processing device 10 as first encrypted packet 241. The time between when the end of the transmission of the first encrypted command and the start of the transmission of the first encrypted packet 241 is the first gap 221. The first plaintext command 201 may require the external nonvolatile memory device 100 to also transmit a second plaintext response 212. That second plaintext response 212 is then encrypted and transmitted to the main processing device 10 as second encrypted packet 242. The time between the end of the transmission of the first encrypted packet 241 and the start of the transmission of the second encrypted packet 242 is the second gap 222.

After the second encrypted packet 242 has been transmitted, there may be a delay before the main processing device 10 issues a second command. This delay is referred to as the third gap 223. This process may then repeat. For example, there may be a fourth gap 224. However, variations are also possible. For example, the external nonvolatile memory device 100 may send only one response to a command. Alternatively, it may send three or more responses. For example, there may be a third encrypted packet 243 and a fourth encrypted packet 244. In other words, FIG. 2 is a representative timing diagram and the disclosure is not limited to the particular sequences shown in the figure.

In the embodiment shown in FIG. 2, the MAC is generated using a GHASH hashing function. In this embodiment, the GHASH hashing function is a hashing algorithm that utilizes blocks of data to create the MAC. This block of data may have a prescribed length. For example, GHASH requires inputs blocks of 128 bits or multiples thereof, while other hashing algorithms may require other lengths. These blocks of data are formed from the sequential arrangement of the received plaintext commands and data such as first plaintext command 201, second plaintext command 202, third plaintext command 203, etc., as well as the plaintext responses, such as first plaintext response 211, second plaintext response 212, third plaintext response 213, fourth plaintext response 214, etc.

The GHASH hashing function, or any other hashing algorithm, operates on blocks of data of a prescribed length. Thus, in operation, the data received and transmitted over the interface 90 is added to a 128 bit word (or other sized word) as it is received or transmitted. When the 128 bit word is filled, it is used by the hashing algorithm to create the hash. The 128 bit word is then reset and ready to receive more data. This process repeats until it is time to transmit the MAC.

Specific embodiments detailing how the blocks of data are formed are described below.

The gaps may be handled in a plurality of ways. In a first embodiment, only the plaintext versions of the data actually transmitted between the two devices is used to form the blocks of data to generate the MAC 245. Thus, once the number of received and transmitted bits reaches the prescribed length, the block of data is used by the hashing function. The block is then reset and the process repeats. However, if a MAC is to be sent at regular time intervals, the number of the blocks of data used to generate the MAC may vary, depending on how much traffic occurred on the interface 90. Further, it is possible that the number of bits that were transmitted is not a multiple of the prescribed length. In this case, when it is time to transmit the MAC, the current block of data may have less than the prescribed number of bits. To remedy this, the remainder of the current block may be filled with static data (such as zeros) or pseudorandom numbers to pad the data block to the prescribed number of bits. This padded block is then used by the hashing function.

In a second embodiment, the gaps are incorporated into the MAC generation. For example, in one aspect, for each bit time when the interface 90 is idle, a 0 is inserted into the block of data. For example, assume that the data is transmitted at 2.5 GHz, and that there is a period of 10 nanoseconds when the interface 90 is idle between the end of the first encrypted command and the start of the first encrypted packet. Since each bit is 400 picoseconds, zeros are inserted in the block of data between the end of the first plaintext command 201 and the first plaintext response 211. When the number of bits in the block of data reaches the prescribed length, which may be 128 bits, the block of data is used in the hashing algorithm and the block of data is reset so that new data may be introduced.

In another embodiment, pseudorandom numbers are inserted in the block of data between the end of the first plaintext command 201 and the first plaintext response 211. In one embodiment, the pseudorandom numbers may be a predetermined length, such as 8 or 16 bits. In this embodiment, both devices must recognize that gaps must be a multiple of this predetermined length. In other words, if the external nonvolatile memory device 100 wishes to transmit the second encrypted packet 242, it must do so at specific times so that an entire pseudorandom number can be added to the block of data that is to be used by GHASH 230.

In another variation of this embodiment, pseudorandom numbers are generated and then introduced bit by bit into the data block used by the GHASH 230. Thus, if the second encrypted packet 242 is transmitted before the entire pseudorandom number has been transferred to the GHASH 230, the transfer of the pseudorandom number to the GHASH 230 is paused, the second plaintext response 212 is added to the GHASH 230, and the transfer of the pseudorandom number is continued afterwards. In other words, the beginning of the pseudorandom number and the remainder of the pseudorandom number envelop the second plaintext response 212.

Importantly, in these embodiments, the block of data that is used to generate the MAC involves both data that was received by the device and data that was transmitted from the device.

Figure 3:
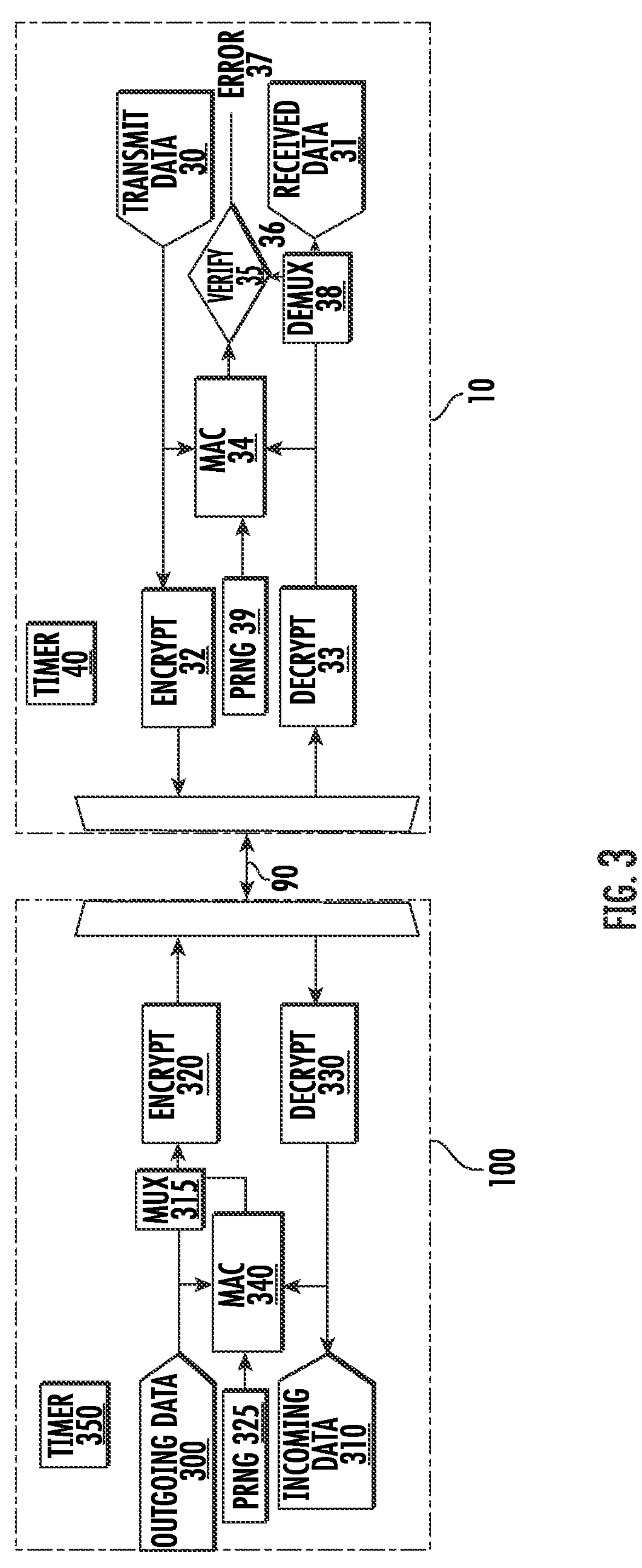
FIG. 3 is a block diagram of the system according to one embodiment.

FIG. 3 shows a simplified block diagram of this system. The external nonvolatile memory device 100 is disposed on the left, while the main processing device 10 is disposed on the right. An interface 90 is used to communicate between these two devices. Each of the blocks in this figure represent circuitry that may be implemented using transistors, logic gates and storage elements.

For the external nonvolatile memory device 100, data to be transmitted, or outgoing data 300, which is in the form of plaintext, is supplied to the MAC generator 340 and to the multiplexer 315. At this time, the multiplexer 315 is configured to allow the outgoing data 300 to pass through to encryption module 320. This outgoing data 300 may be data that is stored in the nonvolatile memory, for example. In other embodiments, the outgoing data 300 may be responses to commands issued by the main processing device 10. The encryption module 320 encrypts the outgoing data 300 using AES-CTR or another stream cipher. The encrypted data then is transmitted over the interface 90. The encrypted data sent by the external nonvolatile memory device 100 is received by the main processing device 10. The encrypted data then passes through the decryption module 33, which transforms the received encrypted data into plaintext data. This plaintext data then enters a demultiplexer 38 which routes the output either to the rest of the main processing device 10 as received data 31, or to the MAC verifier 35. In addition, the received plaintext is supplied to the MAC generator 34. This MAC generator uses the same algorithm as MAC generator 340.

Likewise, for the main processing device 10, data to be transmitted, or transmit data 30, which is in the form of plaintext, is supplied to the MAC generator 34 and to the encryption block 32. The encryption block 32 encrypts the transmit data 30 using AES-CTR or another stream cipher. The encrypted data then is transmitted over the interface 90. The encrypted data sent by the main processing device 10 is received by the external nonvolatile memory device 100. The encrypted data then passes through the decryption module 330, which transforms the received encrypted data into plaintext data. This received plaintext data, also referred to as incoming data 310 is then available to the rest of the external nonvolatile memory device 100. In addition, the incoming data 310 is supplied to the MAC generator 340.

After the predetermined period of time has passed, the external nonvolatile memory device 100 transmits the MAC that was generated by the MAC generator 340 to the main processing device 10. To do this, the multiplexer 315 is reconfigured to allow the MAC to pass to the encryption module 320. As with all other outgoing communications, the MAC passes through the encryption module 320 before being transmitted over the interface 90. The main processing device 10 receives the encrypted MAC, and it passes through the decryption module 33. The output of the decryption module 33 is a plaintext version of the MAC. The demultiplexer 38 is then reconfigured to allow the plaintext version of the MAC, referred to as RX MAC 36, to be passed to the MAC verifier 35. The MAC verifier 35 may be a large comparator. The RX MAC 36 is then compared to the MAC created by the MAC generator 34. If the results match, all of the data transmitted and received over the last predetermined period of time is correct and free of breaches. If the results do not match, there may be a breach in security. This result may be reported as error 37 to the processing unit.

Note that the predetermined period of time may expire in the middle of a transfer. In this embodiment, the transfer may be paused to allow the MAC to be transmitted. The transfer then continues at the point where it was interrupted. For example, the external nonvolatile memory device 100 may be in the middle of sending a word of data when the timer expires. In this case, the multiplexer 315 is reconfigured to allow the MAC to be presented to the encryption module 320 at the appropriate time. At the same time, the demultiplexer 38 in the main processing device 10 is also reconfigured to divert the received plaintext data to the MAC verifier 35. After the MAC has been transmitted, the multiplexer 315 and the demultiplexer 38 revert to their default state.

In addition, as described above, at times, referred to as gaps, there is no data being transmitted over the interface 90. During these times, the MAC generators 34, 340 may be supplied with other filler data. As described above, in some embodiments, this filler data may be static data, such as a string of zeros. In other embodiments, this filler data may be pseudorandom numbers. These pseudorandom numbers may be generated by pseudorandom number generators (PRNG) 39, 325.

In some embodiments, the MAC generator 340 has an internal multiplexer than selects between the incoming data 310, outgoing data 300 and pseudorandom numbers from the PRNG 325. This internal multiplexer may be controlled by a state machine or other logic that monitors the interface 90 to determine whether data is being transmitted and the direction of that transmission. A similar internal multiplexer may be disposed within the MAC generator 34.

In one embodiment, the entire MAC, as generated by the hashing function, is transmitted over the interface 90. In certain embodiments, it may be beneficial to transmit a truncated or encoded version of the MAC to minimize the bandwidth impact of sending the entire MAC. In one embodiment, only N bits of the MAC are transmitted. These may be the last N bits of the MAC, the first N bits of the MAC, or some subset of N bits. In another embodiment, the MAC, which may be 128 bits is subject to an encoding scheme that results in N bits. In some embodiments, N may be a 16, 32, 48 or 64 bits. Of course, other lengths may also be used.

Note that in the embodiment described above, the MAC is calculated from both transmitted and received data. In another embodiment, the MAC generators in each device shown in FIG. 3 may be duplicated so that one MAC generator is responsible for calculating the MAC for all incoming data and the second MAC generator is responsible for calculating the MAC for all outgoing data.

Further, in the embodiment described above, the MAC is transmitted from the external nonvolatile memory device to the main processing device 10. However, in other embodiment, the MAC may be transmitted to the external nonvolatile memory device. In yet another embodiment, both devices transmitted the calculated MAC, and these MACS are verified by both devices.

In addition, the embodiment described herein discloses that the MAC is transmitted over the same interface 90 that is used to transmitted the data signals. In another embodiment, the MAC may be transmitted using a separate or dedicated interface. This secondary interface may be configured such that it is a unidirectional interface from the external nonvolatile memory device to the main processing device.

Finally, the above disclosure describes the two devices as being a main processing device 10 and an external nonvolatile memory device 100. However, the disclosure is not limited to this embodiment. This interface and security scheme may be used between any two devices.

In another embodiment, the encrypted data that is actually transmitted over the interface is used as the input to the GHASH 230.

Figure 4:
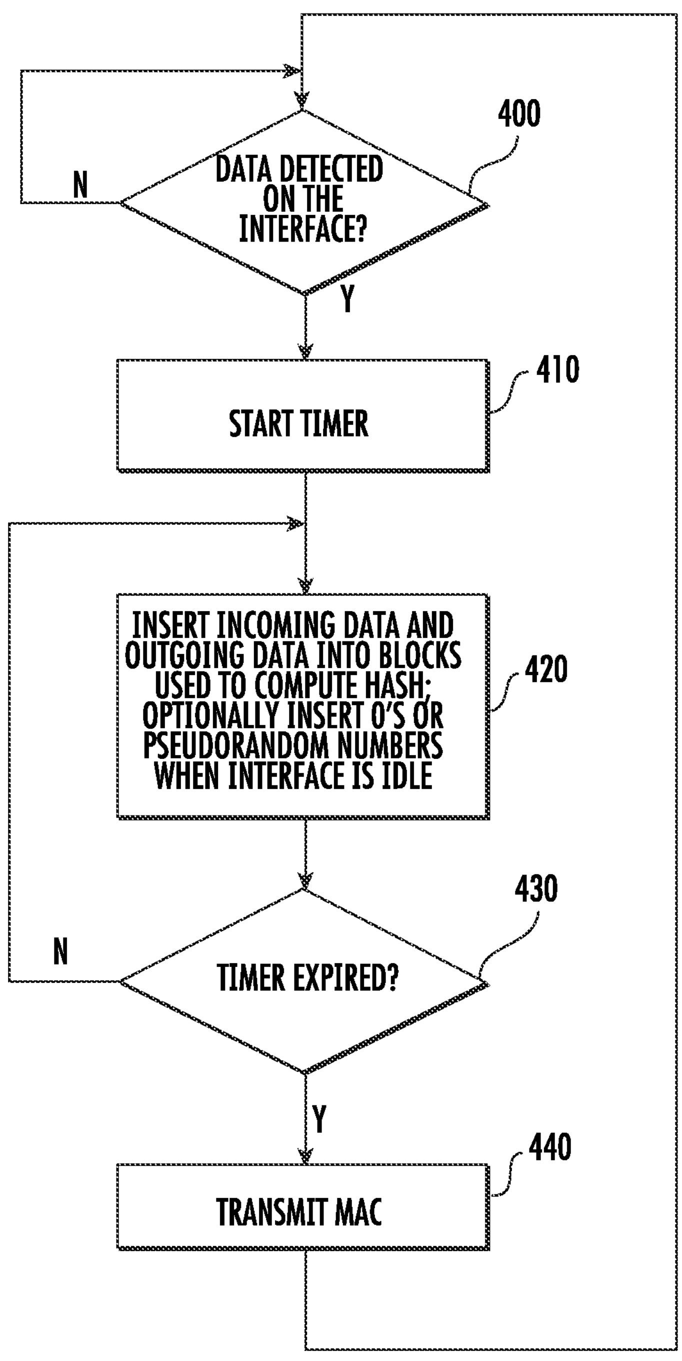
FIG. 4 shows a flowchart showing the sequence described herein.

In certain embodiments, a timer 40,350 is disposed in each device. The timer is used to count the amount of time since the current MAC computation period began. Specifically, after the devices first power up, the timer does not begin until the first transmission takes place on the interface 90. From that point, the timer then counts until the predetermined period of time has passed. The timer does not restart until the next transmission takes place on the interface. FIG. 4 shows this sequence. The controller waits at Box 400 waiting for data to be detected on the interface 90. This data may originate at either the main processing device 10 or the external nonvolatile memory device 100. Once data is observed on the interface 90, the devices start their respective timers, as shown in Box 410. After that, the devices start assembling blocks of data using the incoming and outgoing data, as shown in Box 420. Optionally, as described above, the devices may also insert static data, such as a string of zeros, or pseudorandom numbers when the interface 90 is idle. This process continues until the timer expires, as shown in Box 430. Once the timers expire, the MAC is transmitted over the interface 90, as shown in Box 440. Note that the MAC is encrypted using the same stream cipher used for the data. Once the MAC is transmitted, the devices return to Box 400, and wait for the next data bit to be transmitted over the interface 90 before restarting the timers.

The present system has many advantages. This approach guarantees that a perturbation will be discovered in a deterministic amount of time. Further when the interface 90 is fully utilized, the overhead is low (large amounts of data per MAC). Conversely, when the interface 90 is at low utilization, the security guarantee is maintained. This comes with high overhead; however, this is not important since the interface utilization is so low.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for securely transmitting data between a first device and a second device, comprising:

the first device, comprising:

an interface to transmit and receive data from the second device;

a first encryption module to encrypt outgoing data before it is transmitted over the interface;

a first decryption module to decrypt data received from the second device and create incoming data; and a first message authentication code (MAC) generator, wherein the first MAC generator comprises a hashing algorithm that utilizes the outgoing data transmitted by the first device and the incoming data received by the first device over the interface during a predetermined time period to compute a first MAC;

wherein the outgoing data and the incoming data are arranged sequentially in a data buffer, and when the data buffer reaches a predetermined length, the first MAC generator computes a hash;

wherein the first device transmits the first MAC to the second device based on expiration of a timer; and the second device, comprising:

the interface to transmit and receive data from the first device;

a second encryption module to encrypt transmit data before it is transmitted over the interface;

a second decryption module to decrypt data received from the second device and create received data;

a second message authentication code (MAC) generator, wherein the second MAC generator comprises the hashing algorithm that utilizes the data transmitted by the second device and the received data; and a verifier to compare the first MAC received from the first device to a second MAC generated by the second MAC generator.

2. The system of claim 1, wherein the first encryption module, the second encryption module, the first decryption module and the second decryption module implement a stream cipher.

3. The system of claim 2, wherein the stream cipher is AES-CTR.

4. The system of claim 1, wherein the hashing algorithm is GHASH.

5. The system of claim 1, wherein gaps between transmissions on the interface are filled in the data buffer.

6. The system of claim 5, wherein static data are used to fill the data buffer during the gaps.

7. The system of claim 5, wherein the first device comprises a first pseudorandom number generator, and wherein pseudorandom numbers are used to fill the data buffer during the gaps.

8. The system of claim 1, wherein upon expiration of the timer, if the data buffer has less than the predetermined length, a remainder of the data buffer is filled with static data.

9. The system of claim 1, wherein the first device comprises a first pseudorandom number generator, and wherein upon expiration of the timer, if the data buffer has less than the predetermined length, a remainder of the data buffer is filled with pseudorandom numbers.

10. A method of securely transmitting and receiving data on an interface, comprising:

encrypting, by a first encryption module at a first device, outgoing data before it is transmitted over the interface;

decrypting, by a first decryption module at the first device, data received from a second device and creating incoming data; and computing, by a first message authentication code (MAC) generator at the first device, a first message authentication code (MAC) using a hashing algorithm that utilizes the outgoing data transmitted by the first device and the incoming data received by the first device over the interface during a predetermined time period;

wherein the outgoing data and the incoming data are arranged sequentially in a data buffer, and when the data buffer reaches a predetermined length, the first MAC generator computes a hash;

transmitting the MAC from the first device to the second device when a timer expires;

encrypting, by a second encryption module at the second device, transmit data before it is transmitted over the interface;

decrypting, by a second decryption module at the second device, data received from the second device and creating received data;

computing, by a second message authentication code (MAC) generator at the second device, a second message authentication code (MAC) using a hashing algorithm that utilizes the data transmitted by the second device and the received data;

and comparing the first MAC received from the first device to the second MAC generated by the second MAC generator.

11. The method of claim 10, wherein static data is inserted in the data buffer when the interface is idle.

12. The method of claim 10, wherein pseudorandom numbers are inserted in the data buffer when the interface is idle.

13. The method of claim 10, wherein the outgoing data transmitted and the incoming data received on the interface is encrypted using a stream cipher.

14. The method of claim 13, wherein the method further comprises:

utilizing the stream cipher to encrypt the MAC prior to transmitting.

15. The method of claim 13, wherein the incoming data received on the interface is decrypted before being arranged in the data buffer.

16. The method of claim 13, wherein outgoing data to be transmitted is arranged in the data buffer prior to being encrypted.

17. The method of claim 10, wherein the timer is started when data is detected on the interface to time the predetermined time period.

* * * * *